(12) United States Patent
Berman et al.

(10) Patent No.: US 7,102,839 B2
(45) Date of Patent: Sep. 5, 2006

(54) MAGNETIC RECORDING CHANNEL UTILIZING CONTROL FIELDS FOR TIMING RECOVERY, EQUALIZATION, AMPLITUDE AND AMPLITUDE ASYMMETRY

(75) Inventors: David Berman, San Jose, CA (US); Constantin Michael Melas, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 404 days.

(21) Appl. No.: 10/699,132

(22) Filed: Oct. 31, 2003

(65) Prior Publication Data

US 2005/0094301 A1    May 5, 2005

(51) Int. Cl.
*G11B 5/09* (2006.01)

(52) U.S. Cl. .............................. 360/48; 360/51; 360/65
(58) Field of Classification Search ..................... None
See application file for complete search history.

(56) References Cited

U.S. PATENT DOCUMENTS

| | | | |
|---|---|---|---|
| 4,553,228 A | 11/1985 | Gerard et al. | |
| 4,636,893 A | 1/1987 | McClure | |
| 4,823,212 A * | 4/1989 | Knowles et al. | 360/77.08 |
| 4,890,299 A | 12/1989 | Dolivo et al. | |
| 4,912,585 A | 3/1990 | Belser et al. | |
| 5,073,834 A * | 12/1991 | Best et al. | 360/77.08 |
| 5,220,294 A | 6/1993 | Ichikawa | |
| 5,258,933 A | 11/1993 | Johnson et al. | |
| 5,359,631 A | 10/1994 | Behrens et al. | |
| 5,375,145 A | 12/1994 | Abbott et al. | |
| 5,396,376 A * | 3/1995 | Chambors et al. | 360/48 |
| 5,422,760 A * | 6/1995 | Abbott et al. | 360/46 |
| 5,438,460 A | 8/1995 | Coker et al. | |
| 5,459,679 A | 10/1995 | Ziperovich | |
| 5,576,910 A * | 11/1996 | Romano et al. | 360/77.08 |
| 5,587,223 A | 12/1996 | White | |
| 5,680,267 A | 10/1997 | Tanaka et al. | |
| 5,748,401 A * | 5/1998 | Kawai | 360/78.14 |
| 5,760,983 A * | 6/1998 | Cowen | 360/48 |
| 5,820,769 A | 10/1998 | Chou | |
| 5,825,579 A * | 10/1998 | Cheung et al. | 360/77.08 |
| 6,084,924 A | 7/2000 | Melas | |
| 6,108,152 A * | 8/2000 | Du et al. | 360/51 |
| 6,118,833 A | 9/2000 | Bergmans et al. | |

(Continued)

FOREIGN PATENT DOCUMENTS

JP    11037975    2/1999

OTHER PUBLICATIONS

R.D. Cideciyan et al., "A PRML System for Digital Magnetic Recording," IEEE Journal On Selected Areas in Communications, vol. 10, No. 1, Jan. 1992, pp. 38-56.

(Continued)

*Primary Examiner*—Wayne Young
*Assistant Examiner*—Dismery Mercedes
(74) *Attorney, Agent, or Firm*—Joseph P. Curtin

(57) ABSTRACT

Channel parameters for a magnetic readback channel are optimized by detecting a readback signal that is recorded on a magnetic medium. The readback signal contains a plurality of predetermined-length control fields. Each control field is arranged between two user data fields and contains at least one transition. At least one selected readback parameter, such as a frequency of a readback channel system clock, a gain of the readback channel, a equalization response of the readback signal, and/or an amplitude asymmetry of the readback channel, is optimized based on information contained in at least one control field.

33 Claims, 3 Drawing Sheets

U.S. PATENT DOCUMENTS

| | | | |
|---|---|---|---|
| 6,252,731 B1 * | 6/2001 | Sloan et al. | 360/31 |
| 6,266,202 B1 * | 7/2001 | Nguyen et al. | 360/53 |
| 6,351,339 B1 | 2/2002 | Bar-Gadda | |
| 6,391,430 B1 | 5/2002 | Fullerton et al. | |
| 6,421,195 B1 | 7/2002 | Rubin et al. | |
| 6,429,986 B1 | 8/2002 | Blaum et al. | |
| 6,429,995 B1 * | 8/2002 | Dobbek et al. | 360/77.08 |
| 6,556,365 B1 * | 4/2003 | Satoh | 360/48 |
| 6,583,943 B1 * | 6/2003 | Malone, Sr. | 360/48 |
| 6,735,040 B1 * | 5/2004 | Galloway et al. | 360/78.06 |
| 6,765,741 B1 * | 7/2004 | Berman et al. | 360/65 |
| 2001/0016271 A1 | 8/2001 | Aoyama | |
| 2002/0060870 A1 * | 5/2002 | Teng et al. | 360/48 |
| 2002/0181131 A1 * | 12/2002 | Lim et al. | 360/31 |
| 2003/0043490 A1 | 3/2003 | Clinton et al. | |
| 2005/0078399 A1 * | 4/2005 | Fung et al. | 360/69 |

OTHER PUBLICATIONS

F. Dolivo et al., "Fast Timing Recovery For Partial-Response Signaling Systems," CH2655-9/89/0000-0573, pp. 573-577.

W.C. Lindsey et al., "A Survey of Digital Phase-Locked Loops," Proceedings Of The IEEE, vol. 69, No. 4, Apr. 1981, pp. 410-431.

K.H. Mueller et al., "Timing Recovery in Digital Synchronous Data Receivers," IEEE Transactions On Communications, vol. COM-24, No. 5, May 1976, pp. 516-531.

* cited by examiner

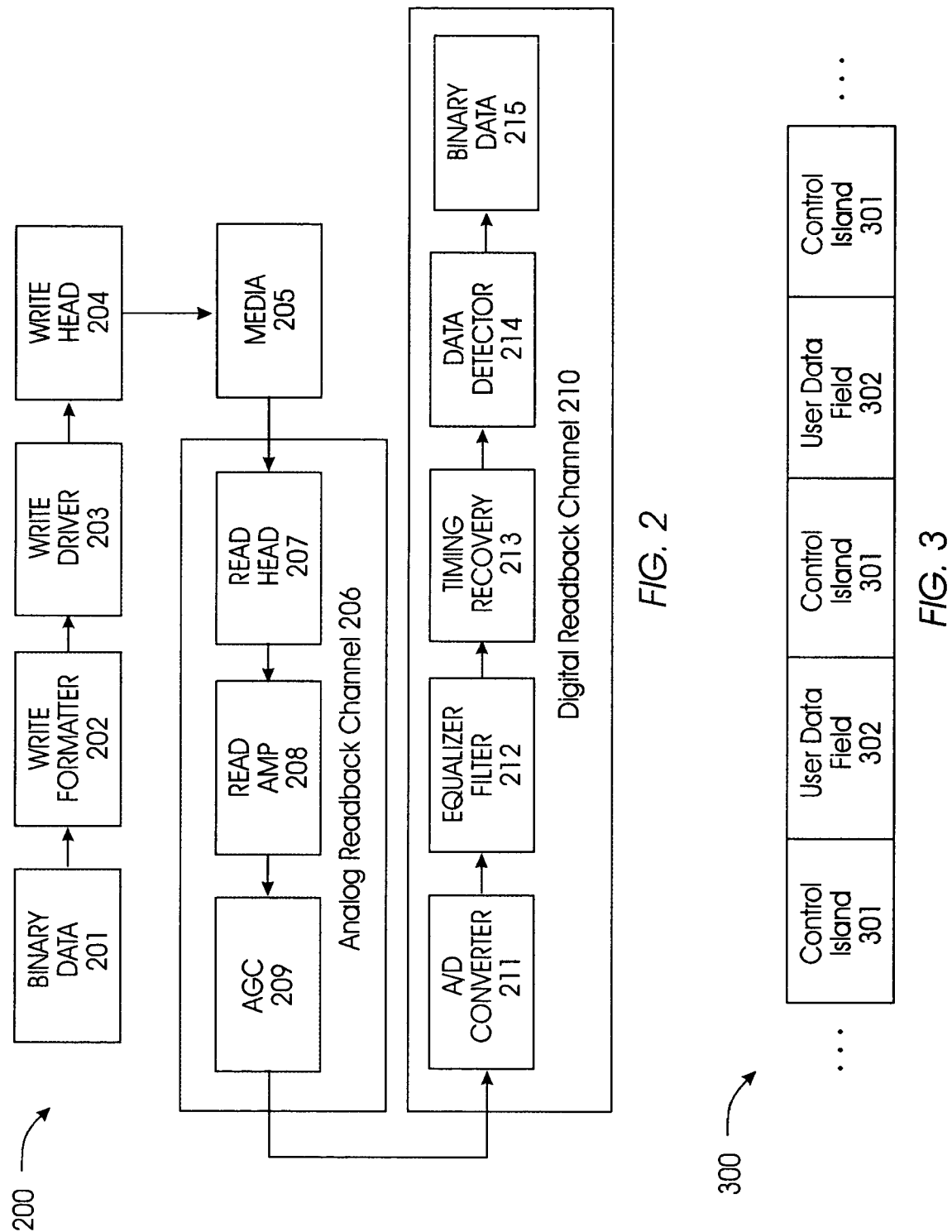

MAGNETIC RECORDING CHANNEL UTILIZING CONTROL FIELDS FOR TIMING RECOVERY, EQUALIZATION, AMPLITUDE AND AMPLITUDE ASYMMETRY

BACKGROUND OF THE INVENTION

1. Field of the Invention

The present invention relates to magnetic storage systems. More particularly, the present invention relates to a system and a method for reliably and accurately optimizing readback channel parameters of a magnetic storage system.

2. Description of the Related Art

FIG. 1 shows a functional block diagram of an exemplary magnetic tape recording system 100 that is connected to a host system 101. Magnetic tape recording system 100 includes read and write circuitry 102, a transducer 103, and a magnetic tape 104. Magnetic tape 104 is contained in a cartridge 105 and is taken up on a take-up reel 106 as magnetic tape 104 is transported past transducer 103. Binary data from host system 101 is stored on magnetic tape 104 by the write portion of read and write circuitry 102 selectively orienting magnetization in user data fields in the magnetic media of magnetic tape 104.

FIG. 2 shows a functional block diagram of the major functional blocks of an exemplary magnetic recording system 200 that is part of a magnetic tape recording system, such as magnetic tape recording system 100 shown in FIG. 1. Recording system 200 includes a write channel portion and a readback channel portion. The write channel portion includes a write formatter 202, a write driver 203 and a write head 204. During a recording operation, binary data 201 that is to be stored on a magnetic medium, such as magnetic tape 104, is input to write formatter 202. Write formatter 202, depending on the implementation, may add extra transitions between data transitions in a process referred to in the art as "write equalization." Write formatter 202 may also shift write pulses in time with respect to a write clock in a well-known manner, known in the art as "write precompensation," to improve recording performance of binary data 201. The output of write formatter 202 is applied to write driver 203, which, in turn is coupled to write head 204. Write head 204 writes binary data 201 onto the surface of magnetic media 205 in a well-known manner.

The readback channel portion of recording system 200 includes an analog readback channel 206 and a digital readback channel 210. Analog read channel 206 includes a read head 207, a read amplifier 208 and an Automatic Gain Control (AGC) system 209. Digital read channel 210 includes an Analog-to-Digital (A/D) converter 211, an equalizer filter system 212, a timing recovery system 213 and a data detector 214.

During a read operation, read head 207 detects stored data from magnetic media 205 and generates a readback signal that is amplified by read amplifier 208. The gain of read amplifier 208 is controlled by AGC system 209 and the output of AGC system 209 is input to digital readback channel 210. A/D converter 211 digitizes the output of AGC system 209. The output of A/D converter 211 passes through equalizer filter system 212 and timing recovery system 213 before being applied to data detector 214. Data Detector 214 outputs the stored binary data 215 that was detected by read head 207 as the readback signal.

The task of the readback channel portion of recording system 200 is to properly decode the written data from the readback signal in the presence of a number of impairments, such as noise, variations in the media velocity, and variations of the head/media transfer function. Variations in the media velocity require that the clock of the readback system be continuously synchronized with the bits written on the magnetic medium by frequent updates to the period and phase of the readback system clock using an error signal that is based on the random data contained in the user data fields. For synchronous-sampling-type systems, the timing recovery feedback loop synchronizes the clock of the analog-to-digital converter. See, for example, R. D. Cideciyan et al., "A PRML System for Digital Magnetic Recording," IEEE Journal on Selected Areas in Communications, Vol. 10, No. 1, pp. 38–56, (1992). In asynchronous-sampling-type systems, the timing recovery feedback loop adjusts the phase of the synchronous sample interpolator. See, for example, U.S. Pat. No. 6,084,924 to C.M. Melas.

Variations in the head/media transfer function require repeated updating of many of the readback channel parameters. For example, the gain of read amplifier 208 must be continuously adjusted to compensate for variations in the head/media spacing, defects on the media surface or in the media itself, and variations in the signal amplitude. Additionally, the overall gain through the readback channel is constantly adjusted by an AGC operation that is performed in the analog domain, such as by AGC system 209, and in the digital domain within digital readback channel 210 using data decisions (not shown). AGC system 209 is a variable gain block that ensures that the amplitude of the signal envelope of the readback stays within prescribed boundaries. The gain control provided by AGC system 209 is conventionally determined by measuring the maximum value of the readback signal within a defined time window and then appropriately adjusting the maximum value to be within the prescribed boundaries. A conventional AGC block for a readback channel operates on the assumption that the random user data signal contains some isolated transitions having the maximum voltage swing. To ensure that this assumption is true, the random user data is conventionally encoded before being written to the magnetic medium. The AGC function of digital readback channel 210 receives an error signal from a data estimator (not shown in FIG. 2) that is the difference between a target signal value, received from the data estimator, and the actual value. The data estimator for the AGC and the timing loops is usually located between the timing recovery and the data detector.

Variations in the head/media transfer function also gives rise to a need for adaptive equalization, which is the process of changing or "adapting" the coefficients of equalizer filter system 212 which shape the readback channel transfer response to be a prescribed transfer function. The most common conventional adaptive equalization techniques utilize a Minimum Mean Square Error (MMSE) approach for continuously updating the coefficients of equalizer filter system 212. The adaptation is calculated based on an ideal, or target, sample value output of a data estimator and a comparison of the ideal sample value with a detected value. A data estimator can have many errors, and to ensure stability, equalizer adaptation is done very slowly using small updates, resulting in a slow convergence of a set of equalizer coefficients. Large levels of noise, however, can cause the adaptation algorithm to diverge.

All of the abovementioned channel parameter updates are conventionally based on the readback signal corresponding to the random user data stored on the magnetic medium as the readback signal is detected by the read head. Accordingly, the random data is estimated using a fast method and the estimates are used for setting the various control loops, such as timing recovery, AGC control and the adaptive equalization. When a fast estimation technique, such as a slicer, is used, very little noise can be tolerated before errors occur. When too many errors occur during the estimation process, the various control loops can become unstable, especially the timing control loop, resulting in very large blocks of errors. More reliable techniques of estimating the data introduce too much delay in the feedback loops. Thus, control loops that rely on data from a fast, but noisy estimator technique limit the level of noise in the system that can be tolerated by the read channel.

Consequently, what is needed is a technique for reliably and accurately optimizing timing recovery, AGC control and adaptive equalization of a readback channel.

BRIEF SUMMARY OF THE INVENTION

The present invention provides a technique for reliably and accurately optimizing timing recovery, AGC control and adaptive equalization of a readback channel by using dedicated control fields that are separate from data fields of a readback signal. Additionally, the present invention provides a technique for optimizing the bias current of a magnetoresistive (MR) read sensor using dedicated control fields.

The advantages of the present invention are provided by a system and a method for adjusting channel parameters for a magnetic readback channel. A readback signal that has been recorded on a magnetic medium is detected. According to the present invention, the readback signal contains a plurality of user data fields that each have a predetermined length, and at least one control field. Each control field is arranged between two user data fields and contains at least one transition. At least one selected readback channel parameter is adjusted based on information contained in at least one control field. Preferably, at least one selected readback channel parameter is optimized based on information contained in at least one control field.

For example, when at least two successive control fields contain only one transition, the frequency of a readback channel system clock can be adjusted based on a relative temporal position of the transition in each successive control field, such as by adjusting at least one of a frequency and a phase of the readback channel system clock. When at least one control field contains an isolated transition, the gain of the readback signal can be adjusted based on the measured amplitude of the transition in each control field. When at least one control field contains a dibit, the readback channel system clock can be adjusted based on a relative temporal position a zero crossing of each dibit in each successive control field, such as by adjusting at least one of a frequency and a phase of the readback channel system clock. When at least one control field contains a positive and a negative transition, the amplitude asymmetry of the readback signal can be adjusted based on the measured amplitude of each transition in each control field, such as by changing a bias current through an MR sensor so that the MR sensor operates in a linear operating mode. When at least one control field contains an isolated transition, the equalization response of the readback signal can be adjusted using the sampled waveform of the corresponding pulse and the desired pulse signal.

BRIEF DESCRIPTION OF THE DRAWINGS

The present invention is illustrated by way of example and not by limitation in the accompanying figures in which like reference numerals indicate similar elements and in which:

FIG. 2 shows a functional block diagram of the major functional blocks of an exemplary magnetic recording system;

FIG. 3 depicts a portion of an exemplary format arrangement having control fields for accurately and reliably optimizing channel parameters according to the present invention.

DETAILED DESCRIPTION OF THE INVENTION

The present invention provides a technique for reliably and accurately optimizing timing recovery, AGC control and adaptive equalization of a readback channel by using dedicated control fields that are separate from data fields of a readback signal. Additionally, the present invention provides a technique for optimizing the bias current of an MR read sensor using the dedicated control fields. Because the position and information forming the control fields are known a priori, there is no need for the readback channel to have a data estimator. Thus, problems associated with a conventional data estimator are eliminated and the various control loops of the readback channel operate reliably in the presence of greater noise and the areal density with which the read channel can operate is increased.

The present invention provides a magnetic recording system that utilizes control signal fields that are inserted between data signal fields for accurately and reliably optimizing channel parameters, such as readback clock frequency and phase, equalizer filter coefficients, readback amplifier gain, read bias current for minimizing amplitude asymmetry, and write current or write precompensation for minimizing nonlinear transition shift. According to the present invention, each control field includes one or more magnetic transitions depending on the particular channel parameter the control field is intended to optimize. For example, timing and equalization derivation can be performed with a control field having either a single isolated transition, or a dibit. Amplitude asymmetry control is accomplished using a control field having two transitions of opposite polarity. When control fields are inserted into a binary data stream, the data fields must not interfere with the control fields. Consequently, the control fields begin and end with a sufficient number of zeros to be free from interference from data fields.

FIG. 3 depicts a portion of an exemplary format arrangement 300 having control fields, or "islands," 301 for accurately and reliably optimizing channel parameters according to the present invention. Control fields 301 are relatively short fields that are recorded on a magnetic medium, such as a tape or disk data track, at a predetermined spacing between user data fields 302.

Figure 1:
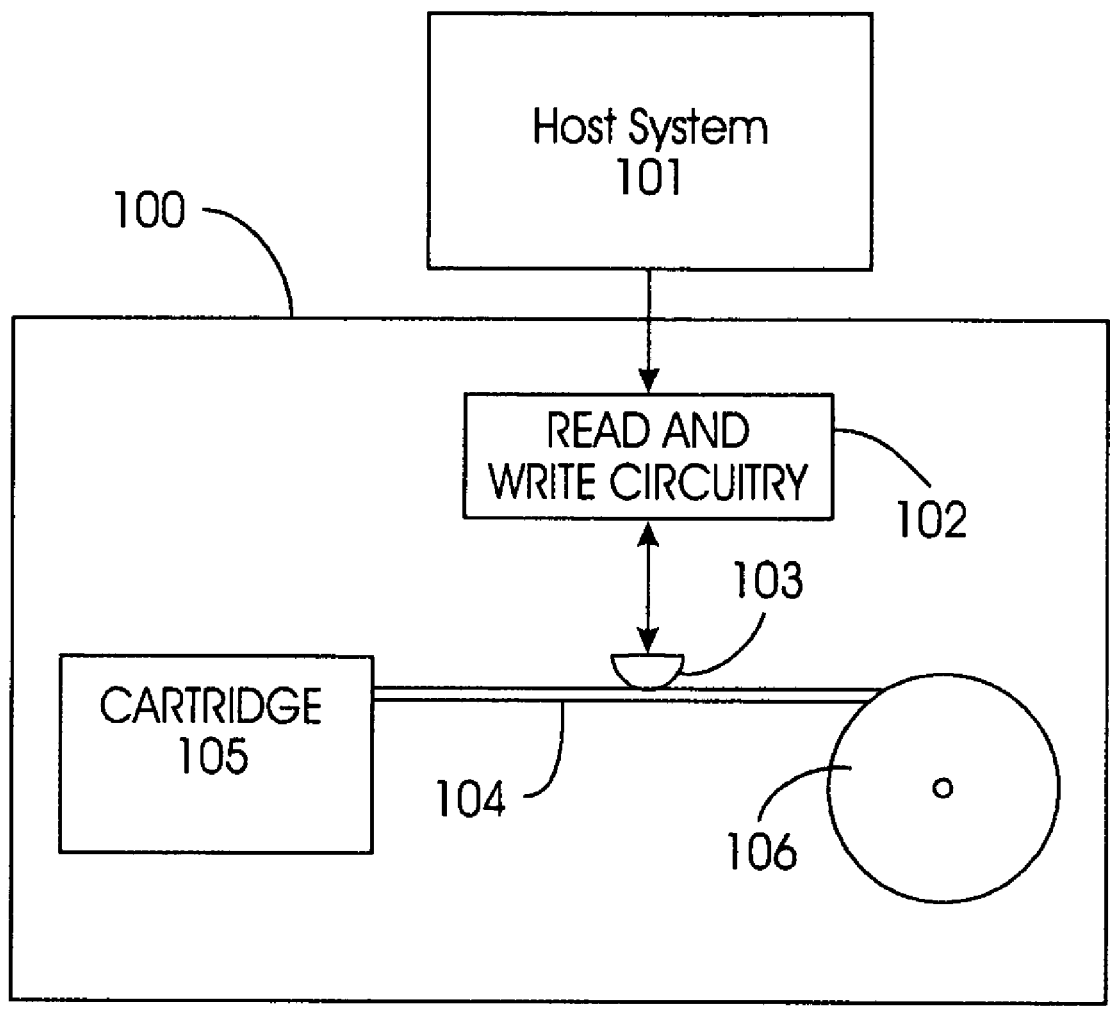
FIG. 1 shows a functional block diagram of an exemplary magnetic tape recording system.
Figure 4:
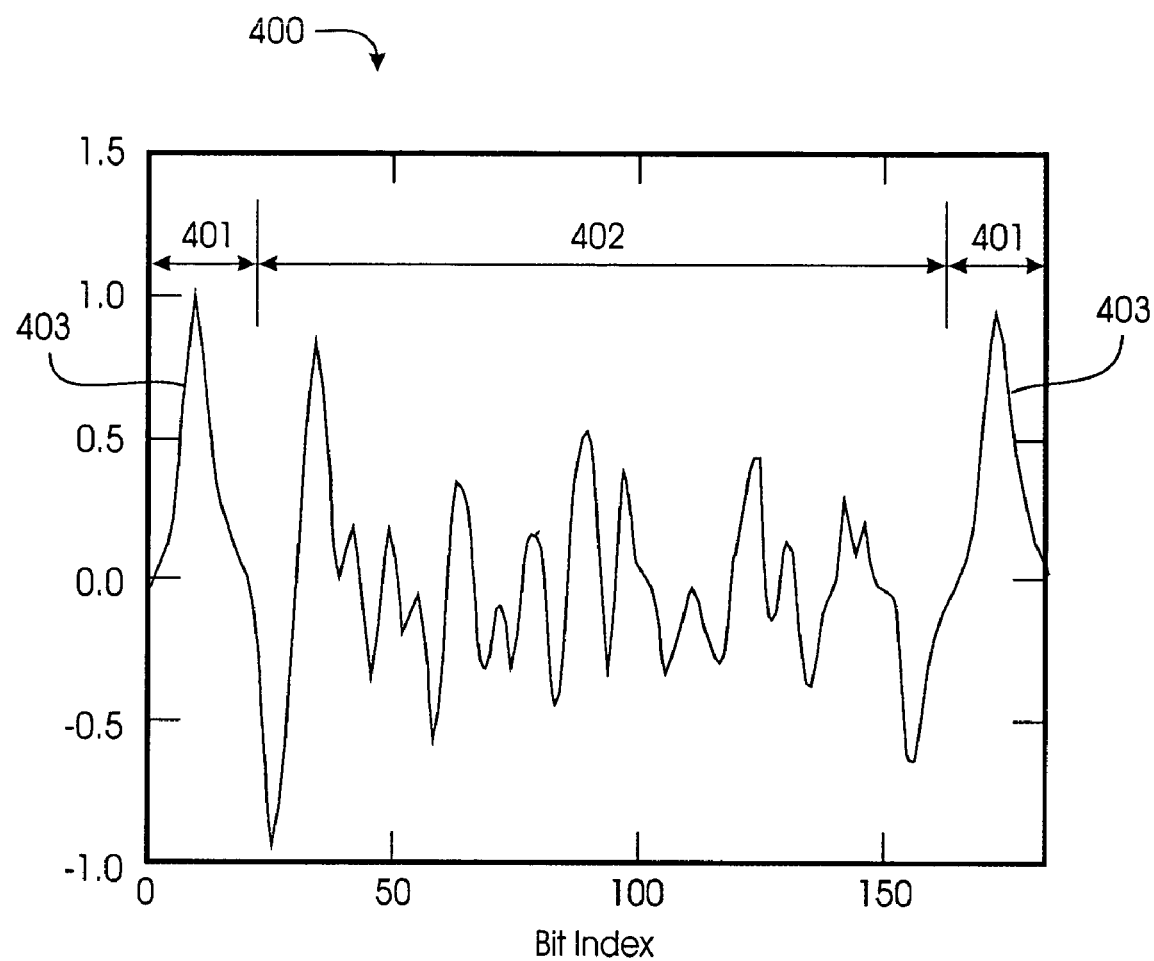
FIG. 4 depicts a portion of an exemplary readback waveform having embedded control fields consisting of a single, isolated positive pulse according to the present invention.

FIG. 4 depicts a portion of an exemplary readback waveform 400 having embedded 16-bit control fields 401 consisting of a single, isolated positive pulse. In waveform 400, user data field 402 consists of 147 bits of random user data, surrounded by the 16-bit control fields 401, which are used to update all the control loops of a digital read channel. Because control fields 401 are separate from user data fields 402, the control functions provided by control fields 401 are completely decoupled from the user data signal.

The timing recovery system of a readback channel requires repeated updates to the phase and frequency of the readback clock based on a timing error signal. Rather than using the random data contained in user data fields 402 for generating the timing error signal, the present invention uses only the timing information associated with control fields 401 to generate a timing error signal. For example, FIG. 4 depicts timing control fields 401 that each have an isolated pulse 403. The relative temporal position of peak 403 contained in two successive timing control fields is obtained accurately and serves to generate the timing error signal. The number of user data bits between two consecutive timing fields 401 is predetermined so the spacing (i.e., the timing) between peaks 403 in control fields 401 serves as an instantaneous measure of frequency.

By using only timing control fields for generating the timing error signal, each timing control field portion of a readback waveform can be filtered more heavily than the user data portion of the readback waveform, so less high-frequency noise is present. Moreover, a use of timing control fields allows the user data to be encoded in a way to increase user data density because the encoded user data is not used for timing recovery. Further, use of a timing control field according to the present invention eliminates the need for a data estimator for timing recovery. As an alternative to a timing control field having an isolated pulse, a dibit can be used, in which case, the position of the zero crossing in the middle of the dibit is used for the basis of the timing error signal instead of the position of a peak. Use of a zero crossing for timing is affected less by high frequency noise than a single transition, but is more sensitive to DC offsets.

The present invention provides a technique for optimizing AGC by utilizing a control field containing an isolated transition having a peak with the maximum possible voltage level prescribed for the readback signal. Consequently, the need for conventionally encoding the random user data in a manner that provides AGC control information is eliminated. Further, similar to the technique for optimizing timing recovery according to the present invention, the need for a data estimator for AGC control is eliminated. Moreover, the technique for optimizing AGC according to the present invention increases the density of user data stored on the magnetic media because the user data is not required to be encoded to provide AGC control information.

Equalizer filter system 211 filters, or shapes, the readback channel transfer response to be a prescribed transfer function. Equalizer filter system 211 must adapt to the changes in the readback environment, such as variations in the magnetic spacing between the head and the media, variations in media thickness or composition, and temperature variations. The present invention uses the isolated transitions contained in control fields for calculating equalizer coefficients because the response of an isolated transition or a dibit represents the impulse response of the linear magnetic recording system. Accordingly, there are many advantages to using a control field of the present invention for equalizer control. One advantage is that because the contents of the control fields are known, the data estimator, along with its sensitivity to noise, is unnecessary and therefore eliminated. Another advantage is that effects of noise are even further reduced by averaging several isolated transitions from successive control fields.

When a control field 301 contains a positive and a negative transition, their respective amplitudes are easily measured. In a completely linear system, the positive and negative amplitudes should be the same. When there is a difference, the difference is attributed to a phenomenon known as "amplitude asymmetry", which arises from a nonlinear portion of the read sensor response. Amplitude asymmetry has a detrimental effect in the readback channel because it is a nonlinear effect and can potentially cause many errors. Fortunately, amplitude asymmetry can be reduced by altering the bias current through the MR sensor and causing the MR sensor to operate in a more linear region. The present invention uses the amplitude of the positive and negative transitions in control fields 3 01 for updating the bias current through the MR sensor in order to reduce amplitude asymmetry.

The functions of control fields 301 can be incorporated in a digital read/write channel of a magnetic tape drive. The function of the read channel is to process the digitized waveform of the amplified read head signal and extract the written binary stream from this waveform. For example, see U.S. Pat. No. 6,246,733 to Hutchins. When the present invention is incorporated into the digital read/write channel of a magnetic tape drive, the write circuitry would insert the control fields at appropriate positions in the write current waveform driving the write head. The write head would then write the information in the form of a magnetization pattern on the tape media. Moreover, the functions of control fields 301 can also be incorporated into a digital read/write channel of a magnetic disk drive.

Although the foregoing invention has been described in some detail for purposes of clarity of understanding, it will be apparent that certain changes and modifications may be practiced that are within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A magnetic medium having a recording format therein, the format comprising:
    a plurality of user data fields each having a predetermined length; and
    at least one control field, each control field being arranged between two user data fields and containing at least one transaction, at least one control field containing a first portion having a predetermined number of zeros preceding a portion containing each transition of the control field, which precedes a second portion having the predetermined number of zeros, the control field being completely formed by the portion, the portion containing each transition of the control field and the second portion.

2. The magnetic medium according to claim 1, wherein at least two successive control fields contain only one transition.

3. The magnetic medium according to claim 1, wherein at least one control field contains a transition having a predetermined amplitude.

4. The magnetic medium according to claim 1, wherein at least one control field contains a dibit.

5. The magnetic medium according to claim 1, wherein at least one control field contains two transitions, and
    wherein each transition has a predetermined amplitude.

6. The magnetic medium according to claim 1, wherein each control field has a predetermined length.

7. A method for adjusting channel parameters for a magnetic readback channel, the method comprising:
    detecting a readback signal recorded on a magnetic medium, the readback signal containing a plurality of user data fields each having a predetermined length, and at least one control field, each control field being arranged between two user data fields and containing at least one transition, at least one control field containing first portion having a predetermined number of zeroes preceding a portion containing each transition of the control field, which precedes a second portion having the determined number of zeroes, the control field being completely formed by the first portion, the portion containing each transition of the control field and the second portion; and adjusting at least one selected readback channel parameter based on information contained in at least one control field.

8. The method according to claim 7, wherein at least one control field contains a transition having a predetermined amplitude, wherein the selected readback channel parameter is a gain of the readback signal, and wherein said adjusting includes adjusting the gain of the readback signal based on the predetermined amplitude of the transition in each control field.

9. The method according to claim 7, wherein at least one control field contains two transitions and each transition has a predetermined amplitude, wherein the selected readback channel parameter is a gain of the readback signal, and wherein said adjusting includes adjusting the gain of the readback signal based on the predetermined amplitude of each transition in each control field.

10. The method according to claim 7, wherein at least one control field contains a transition having a predetermined amplitude, wherein the selected readback channel parameter is a equalization response of the readback signal, and wherein said adjusting includes adjusting the equalization response of the readback signal based on the predetermined amplitude of the transition in each control field.

11. The method according to claim 7, further comprising recording the readback signal on the magnetic medium.

12. The method according to claim 7, wherein said adjusting at least one selected readback parameter includes optimizing at least one selected readback channel parameter based on information contained in at least one control field.

13. The method according to claim 7, wherein each control field has a predetermined length.

14. A method for adjusting channel parameters for a magnetic readback channel, the method comprising:

detecting a readback signal recorded on a magnetic medium, the readback signal containing a plurality of user data fields each having a predetermined length, and at least two control fields, each control field being arranged between two user data fields and containing at least one peak; and adjusting a frequency of a readback channel system clock based on a relative temporal position of the peak in each successive control field.

15. The method according to claim 14, wherein said adjusting the readback channel system clock includes adjusting at least one of a frequency and a phase of the readback channel system clock.

16. A method for adjusting channel parameters for a magnetic readback channel, the method comprising:

detecting a readback signal recorded on a magnetic medium, the readback signal containing a plurality of user data fields each having a predetermined length, and at least one control field, each control field being arranged between two user data fields and at least two control fields containing a dibit having a zero crossing; and, adjusting a frequency of a readback channel system clock based on a relative temporal position the zero crossing of each dibit in each successive control field.

17. The method according to claim 16, wherein said adjusting the readback channel system clock includes adjusting at least one of a frequency and a phase of the readback channel system clock.

18. A method for adjusting channel parameters for a magnetic readback channel, the method comprising:

detecting a readback signal recorded on a magnetic medium, the readback signal containing a plurality of user data fields each having a predetermined length, and at least one control field, each control field being arranged between two user data fields and containing at least one transition, and at least one control field containing a positive and a negative transition and each transition having a predetermined amplitude; and adjusting is an amplitude asymmetry of the readback signal based on the predetermined amplitude of each transition in each control field.

19. The method according to claim 18, wherein said adjusting the amplitude asymmetry includes changing a bias current through a magnetoresistive sensor so that the magnetoresistive sensor operates in a linear operating mode.

20. A readback system, comprising:

a read head configured to detect a readback signal stored on a magnetic medium, the readback signal containing a plurality of user data fields each having a predetermined length, and at least one control field, each control field being arranged between two user data fields and containing at least one transition, at least one control field containing a first portion having a predetermined number of zeroes preceding a portion containing each transition of the control field, which precedes a second portion having the predetermined number of zeroes, the control field being completely formed by the first portion, the portion containing each transition of the control field and the second portion; and a readback channel coupled to the readback head, wherein the readback channel adjusts at least one selected readback parameter of the readback channel based on information contained in at least one control field.

21. The readback system according to claim 20, wherein at least one control field contains a transition having a predetermined amplitude, wherein the selected readback channel parameter is a gain of the readback signal, and wherein the readback channel adjusts the gain of the readback signal based on the predetermined amplitude of the transition in each control field.

22. The readback system according to claim 21, wherein the readback channel system clock is adjusted by adjusting at least one of a frequency and a phase of the readback channel system clock.

23. The readback system according to claim 20, wherein at least one control field contains two transitions and each transition has a predetermined amplitude, wherein the selected readback channel parameter is a gain of the readback signal, and wherein the readback channel adjusts the gain of the readback signal based on the predetermined amplitude of each transition in each control field.

24. The readback system according to claim 20, wherein at least one control field contains a transition having a predetermined amplitude, wherein the selected readback channel parameter is a equalization response of the readback signal, and wherein the readback channel adjusts the equalization response of the readback signal based on the predetermined amplitude of the transition in each control field.

25. The readback system according to claim 20, wherein the readback channel adjusts at least one selected readback parameter by optimizing at least one selected readback channel parameter based on information contained in at least one control field.

26. The readback system according to claim 20, wherein each control field has a predetermined length.

27. The readback system according to claim 20, wherein the readback channel is part of a hard tape drive.

28. The readback system according to claim 20, wherein the readback channel is part of a magnetic disk drive.

29. A readback system comprising:
a read head configured to detect a readback signal stored on a magnetic medium, the readback signal containing a plurality of user data fields each having a predetermined length, and at least one control field, each control field being arranged between two user data fields and at least two successive control fields containing a peak; and
a readback channel coupled to the readback head, the readback channel adjusting a frequency of a readback system clock based on a relative temporal position of the peak in each successive control field.

30. A readback system comprising
a read head configured to detect a readback signal stored on a magnetic medium, the readback signal containing a plurality of user data fields each having a predetermined length, and at least one control field, each control field being arranged between two user data fields, and at least two control fields containing a dibit having a zero crossing; and
a readback channel coupled to the readback head, the readback channel adjusting a frequency of a readback channel system clock based on a relative temporal position the zero crossing of each dibit in each successive control field.

31. The readback system according to claim 30, wherein the readback channel system clock is adjusted by adjusting at least one of a frequency and a phase of the readback channel system clock.

32. A readback system comprising:
a read head configured to detect a readback signal stored on a magnetic medium, the readback signal containing a plurality of user data fields each having a predetermined length, and at least one control field, each field being arranged between two user data fields and containing at least one transition and at least one control field containing a positive and a negative transition and each transition having a predetermined amplitude; and
a readback channel coupled to the readback head, the readback channel adjusting an amplitude asymmetry of the readback signal based on the predetermined amplitude of each transition in each control field.

33. The readback system according to claim 32, wherein the readback channel changes a bias current through a magnetoresistive sensor so that the magnetoresistive sensor operates in a linear operating mode.

* * * * *